Dec. 6, 1932. F. KASANTZEFF 1,890,088
TRIPLE VALVE FOR DIRECT ACTING RAILWAY BRAKES
Filed Feb. 26, 1929
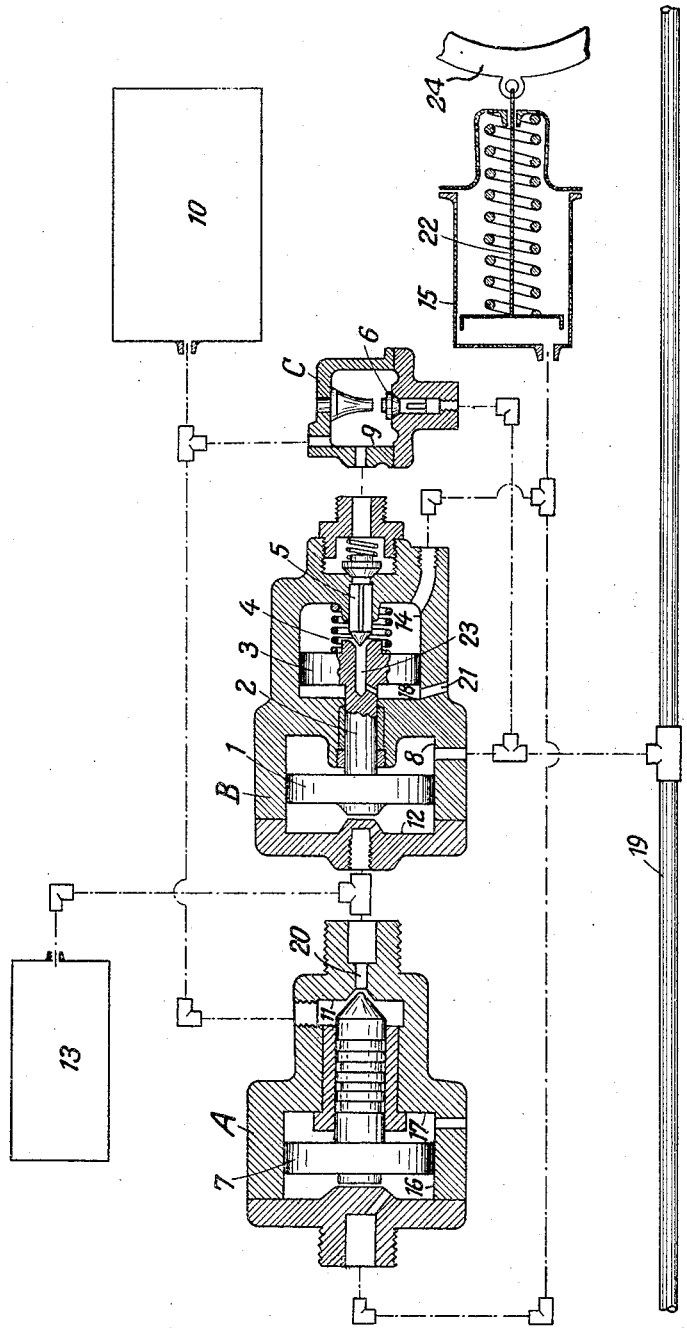
Inventor:
Florentin Kasantzeff
By B. Singer, Atty.

Patented Dec. 6, 1932

1,890,088

UNITED STATES PATENT OFFICE

FLORENTIN KASANTZEFF, OF BERLIN, GERMANY

TRIPLE VALVE FOR DIRECT ACTING RAILWAY BRAKES

Application filed February 26, 1929, Serial No. 342,737, and in Russia October 30, 1927.

The invention concerns a triple valve or distributor for compressed air brakes as used in railways.

The essential feature consists herein, that a member dependent upon the pressures existing in the auxiliary air reservoir and in the brake cylinder is used for governing the connection to a control chamber, so as to fill said chamber during braking applications with air up to certain pressures and maintain said pressures. A further feature consists in providing a second chamber for feeding the brake cylinder in the beginning of a braking application for accelerating the initial movement of the brake blocks, the said chamber being fed with air from the auxiliary reservoir and from the train pipe through passages of suitable cross sectional areas.

The advantage consists herein, that with simple and reliable means during both the application and also the release of the brake any adjusted braking graduation is very quickly brought into effect in the brake cylinder and automatically maintained against any leakage.

The invention is shown by way of example in the accompanying drawing in which an embodiment is shown, partly in section, complication and also the release of the brake cylinder and auxiliary air reservoirs.

Referring to the drawing, the triple valve consists of three main parts A, B, C connected to each other by suitable means. The part B contains two pistons 1, 3 united by a piston rod 2 and loaded by a spring 4 in the direction to the larger piston, so as to cause a double valve 5 to open on its one seat and close on its other seat. The part C contains a feed valve 6 and the part A contains a large differential piston 7 for governing a valve passage 20.

The chambers included between the several pistons are designed as follows: train pipe chamber 8, accelerating chamber 9, inserted between the train pipe 17, the auxiliary reservoir 10 and the inlet 5 to the brake cylinder 15 and containing a small quantity of pressed air available for quickly applying the brake blocks, supplementary reservoir chamber 12 adjoined to one side of the piston 1, operating chamber 16 adjoined to a piston 7 governing the inlet to the supplementary reservoir chamber 12, passage chamber 11 inserted between the supplementary reservoir chamber 12 and the auxiliary reservoir 10, atmospheric chambers 17 and 18, brake cylinder chamber 14. A train pipe 19 is connected to a triple valve, as in usual single train pipe brakes, for feeding the reservoirs and governing the brakes. In addition to a usual auxiliary air reservoir 10, a supplementary air reservoir 13 is provided. A brake cylinder 15 and its piston 22 connected to the brake block 24 are arranged in usual manner. Channels 21, 23 in the piston rod 2 serve for governing the several actions as follows.

During the charging of the brake system the air enters from the train pipe 19 to the chamber 8, so as to drive the pistons 1, 3 to the left, and simultaneously to the chamber 9 and thence to the auxiliary reservoir 10 and to the chamber 11 of the part A. The piston rod of the large piston 7, extending into the said chamber 11 hereby is loaded so as to drive the said piston to the left, so that the passage 20 becomes free and allows the air to penetrate to the chamber 12 and to the supplementary reservoir 13. The chambers 14 and 18 serve for connecting the brake cylinder to the atmosphere.

When the reservoirs are completely charged, the chambers 8 and 12 are at equal pressures. The piston area on the right face of the piston 1 is less than that on the left face by the extent of the cross sectional area of the piston rod 2, but this difference is compensated by the pressure of the spring 4, so that the pistons retain their left hand position.

On an application of the brakes being produced by a pressure decrease in the train pipe 19, the pistons 1, 3 go to the right, so as to close the channel 23 on the double valve 5 and cut off the brake cylinder from the atmospheric chamber 18. A further displacement forces the double valve 5 from its seat, so as to connect the accelerating chamber 9 arranged immediately before the brake cylinder inlet and containing a small quantity of compressed air to the brake cylinder chambers 14 and 16 and to the brake cylinder, which thereby are quickly initially filled up. The sudden drop of pressure until about one atmosphere, produced hereby in the accelerating chamber 9, is thereafter compensated by air flowing in from the train pipe through the valve 6, whereas from the auxiliary reservoir 10 only a small amount of air escapes through the narrow passages. As soon as the pressure in the brake cylinder and in the chamber 16 has been raised to 0.6–0.8 atmospheres, the piston 7 overcomes the pressure acting on its piston rod in the chamber 11 and goes to the right, so as to close the channel 20 and shut off the control chamber 12 and the supplementary reservoir 13 from the auxiliary reservoir 10. The pressure in the chamber 12 remains unaltered during all graduating application of the brakes. In the other chambers the pressures change depends upon the pressure adjusted in the train pipe 19, corresponding to the areas of the different pistons. In the example shown a pressure drop of for example 0.5 atmospheres in chamber 8 produces in the chamber 14 and in the brake cylinder 15 a pressure of about 1.5 atmospheres due to the proportion of the effective faces of the piston 1 and of the piston 3, which proportion is 3:1. Thereby the pistons 1, 3 are balanced in a position, in which they always maintain a certain pressure in the brake cylinder 15 in correspondence to a certain pressure reduction produced in the brake pipe 19, as any want of balance between said pistons causes the necessary quantities of air to be fed or exhaust to or from the brake cylinder.

In releasing the brakes by increasing the pressure in the train pipe 19, the pistons 1, 3 go to the left and open the brake cylinder to the atmosphere through the passages 14, 23, 18, 21, until the pistons are balanced and again close the channel 23. This occurs on a drop of pressure taking place in the brake cylinder, equal to three times the increase of pressure produced in the train pipe.

The same is true for all further graduations in releasing the brakes, in which again all leakage losses are automatically compensated by corresponding displacements of the pistons 1, 3. Thus a specially precise adjustment of the braking pressure is obtained in the sense of strengthening as well as weakening the braking action, and starting from any desired degree of braking or relasing.

A complete relase of the brakes is effected by increasing the pressure in the train pipe 19 and in the chamber 8 to a pressure being 0.2 atmospheres below the pressure existing in the reservoir chamber 12.

The auxiliary reservoir 10 is recharged during the brake releasing action through the feed valve 6 and the accelerating chamber 9. On a drop of pressure to 0.6 atmospheres being produced in the brake cylinder 15, the large piston 7 goes to the left, so as to open the passage 20 and thereby connect the reservoir chamber 12 and the additional reservoir 13 to the auxiliary air reservoir 10.

I claim:

1. A triple valve for direct acting railway brakes, comprising in combination a valve governing the air inlet and exhaust on the brake cylinder, an air pressure transmitting member governing said valve, a chamber connected to the train pipe on one side of said air pressure transmitting member, a control chamber adjoining the other of said air pressure transmitting member, and a valve passage governed by air pressure transmitting means dependent upon the air pressures existing in the auxiliary reservoir and in the brake cylinder for feeding air from the auxiliary reservoir to said control chamber so as to retain therein air at a constant pressure during braking applications.

2. A triple valve for direct acting railway brakes, as claimed in claim 1, wherein the air pressure transmitting means is a differential piston and one chamber adjoining said piston at the smallest face is connected to the auxiliary reservoir, another chamber adjoining the largest piston face is connected to the brake cylinder and an intermediate chamber is connected to the atmosphere.

3. A triple valve for direct acting railway brakes, as claimed in claim 1, wherein an additional air reservoir is connected to the control chamber.

4. A triple valve for direct acting railway brakes, as claimed in claim 1, wherein an accelerating chamber is provided between the auxiliary reservoir and the valve governing the inlet on the brake cylinder so as to contain a quantity of air available for applying the brake blocks, and said accelerating chamber is connected to the auxiliary reservoir by a narrow passage causing an appreciable drop of pressure in said chamber during the application of the brake blocks.

5. A triple valve for direct acting railway brakes as claimed in claim 1, wherein an accelerating chamber is provided between the auxiliary reservoir and the valve governing the inlet on the brake cylinder so as to contain a quantity of air available for applying the brake blocks, and said accelerating chamber is connected to the train pipe by a narrow passage causing an appreciable drop of pressure in said chamber during the application of the brake blocks.

In witness whereof I affix my signature.

FLORENTIN KASANTZEFF.